May 14, 1968   E. MONIN   3,383,572
CONTROL DEVICES FOR MOVABLE CARRIAGES AND THE LIKE
Filed Dec. 1, 1964   2 Sheets-Sheet 1
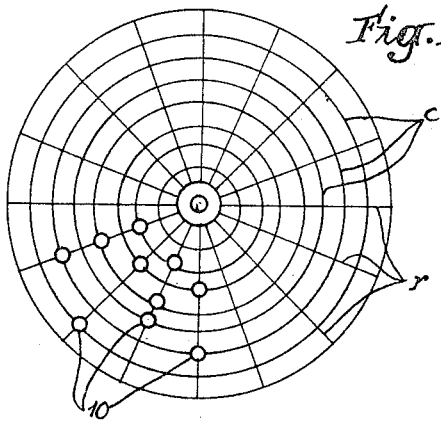
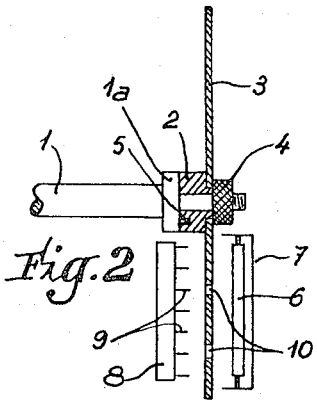
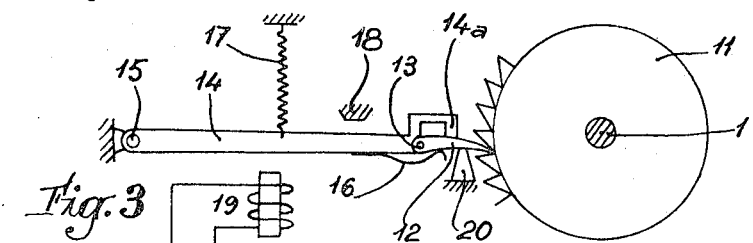
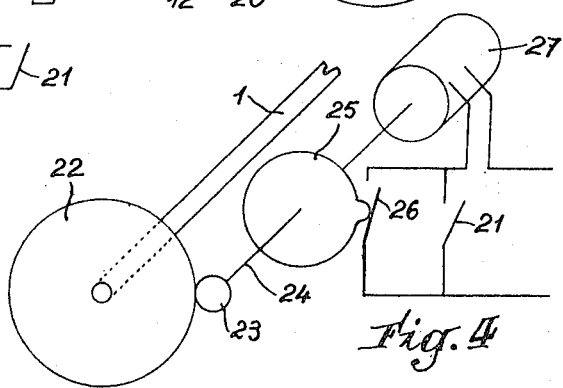
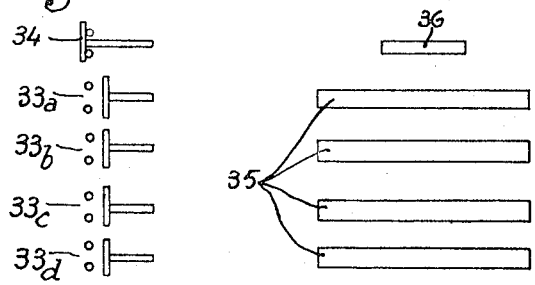
INVENTOR
Edmond Monin
BY
ATTORNEYS

United States Patent Office 3,383,572
Patented May 14, 1968

3,383,572
CONTROL DEVICES FOR MOVABLE CARRIAGES AND THE LIKE
Edmond Monin, Lyon, France, assignor to "C.O.R.E.C.I. Compagnie de Régulation et de Contrôle Industriel," Lyon, France, a French joint-stock company
Filed Dec. 1, 1964, Ser. No. 415,096
Claims priority, application France, Dec. 2, 1963, 44,231
4 Claims. (Cl. 318—18)

ABSTRACT OF THE DISCLOSURE

A device to control the displacement of a movable member along a definite path, stopping the member automatically at plural positions therealong. The device is illustrated by embodiments including a rotary programming disc generating by photoelectric means in its various positions different outputs based upon a binary code representative of the next position at which the movable member should stop, and the movable member and path having plural switching means cooperative to develop a binary output code each time the movable member passes a stoppage position, and this output being representative of that position. The system further includes means for comparing the programmer output with the stoppage position output, and actuating means to stop the movable member when these momentary output codes are identical, the system including auxiliary switching means for operating said stopping means after the output code representing the particular position arrived at has been fully read.

---

The present invention refers to a device for the automatic control of a succession of operative cycles during which a movable member has to be brought to a series of successive positions. As a particular example of such operative cycles, reference may be had to the mechanical handling of articles which have to be submitted to a series of treatments at a number of successive stations. The articles may be for instance in the form of plates which have to be immersed into successive baths for such operations as pickling, bleaching, galvanizing, dyeing, etc. In such plants there is generally provided an upper rail which supports a movable carriage provided with appropriate hoisting devices by means of which the article to be treated may be lowered into the successive baths at the appropriate stations.

It often occurs that the succession of operative cycles has to be modified in order to correspond to another kind of article or to another kind of treatment. It is therefore quite important that the automatic control device be extremely flexible and may be adapted to the new cycle succession with a minimum of difficulty.

The device according to the invention comprises a perforated disc adapted to rotate by successive angular steps between a rectilinear light source and a row of photoelectric cells, in such manner that same may be actuated in correspondence with the perforations of the disc disposed on the radius of the latter which is situated between the source and the cells. It will be appreciated that it is quite easy to prepare thin discs with circular tracks corresponding to the spacing apart of the cells and with a series of radial lines corresponding to the successive angular positions of rest of the disc. In order to prepare an operative cycle the operator only has to perforate a plain disc at the appropriate intersections of the circular tracks and of a radial line for each elementary operation. The angular advance of the disc may be controlled by the movable member (as for instance a carriage) when it reaches a predetermined point of its travel, by the hoisting apparatus supported by the carriage at the end of its ascending or of its descending stroke, or further by a delayed device adapted to provide the necessary time of standstill between some at least of the successive elementary operations. As an example the advancing motion of the disc may be controlled by a relay which detects the state of rest of the unit at the end of a given operation, the advancing mechanism being automatically stopped after an angle corresponding to the passage from an operation to the next one.

The photoelectric cells are preferably in the form of photothyratrons which afford the advantage of giving directly a sufficient current to actuate a relay, without any intermediate amplification.

The detection of the successive positions of the carriage or other movable member may be realized by appropriate stationary contacts disposed along its path.

However when the number of the possible positions or stops is high, this may lead to an excessive number of contact devices, which is a disadvantage, more particularly in the case of electrolytic or chemical treatments involving hot baths which are liable to emit corrosive vapours. This may be avoided, according to the invention, by mounting the contact devices on the carriage itself, the corresponding cam surfaces being of course stationary. The contact devices are thus immediately accessible when the carriage is at one end of its travel, beyond the treating vats or like apparatus. Further these contact devices no more remain permanently in the vicinity of the corrosive baths.

According to another aspect of the present invention, the number of contact devices which is required in the case of a high number of operating stations is reduced by the use of a code, as for instance a binary code, the successive stops of the carriage being referenced by the same code number for the cam surfaces and for perforations of the disc for each position to which the carriage may have to be brought.

In the annexed drawings:

FIG. 1 is a front view of a perforated disc adapted to control the displacement of a movable member, such as a travelling overhead hoisting carriage.

FIG. 2 is a diagrammatical section of the disc showing the position of the tubular light source and of the photothyratrons associated to the disc.

FIGS. 3 and 4 illustrate very diagrammatically two possible embodiments of an advancing mechanism for the disc of FIGS. 1 and 2.

Figure 5:
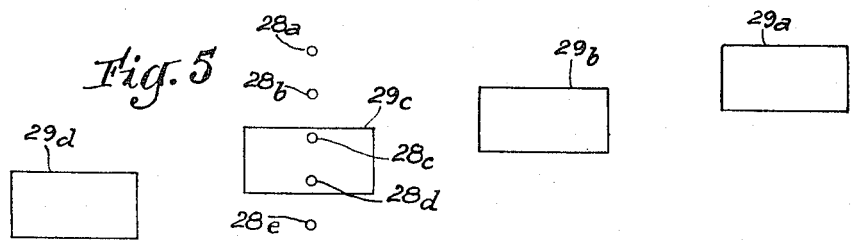

FIG. 5 very diagrammatically shows a first embodiment of a system of stationary cam surfaces and of movable contact devices adapted to insure stoppage of the carriage at the selected position or station.

Figure 6:
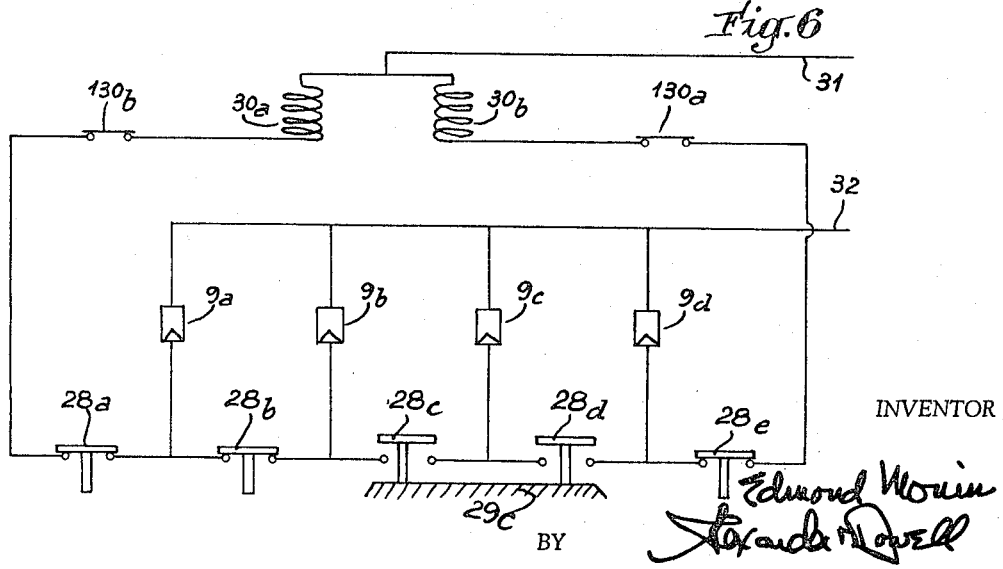

FIG. 6 illustrates the corresponding electrical circuitry.

FIGS. 7 and 8 show another system respectively of movable contact devices and of stationary cam surfaces.

FIG. 9 is a plan view corresponding to FIG. 8.

Figure 10:
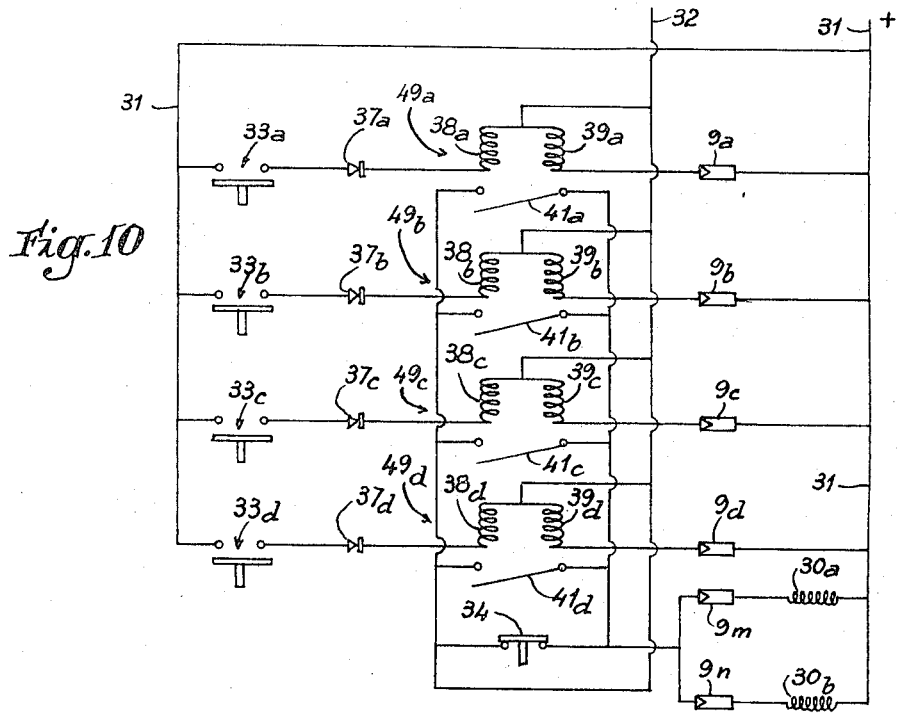

FIG. 10 is a diagram of the electrical circuitry in the system of FIG. 7–9.

The programming device illustrated in FIGS. 1 and 2 comprises a shaft carried in appropriate bearings, not illustrated, and which is rotated by successive steps in the manner which will be described below. Shaft 1 supports a small hub 2 onto which is secured a perforated disc 3 of relatively large diameter. Hub 2 is removably clamped on shaft 1 by means of a nut 4 screwed on the screw-threaded end of shaft 1 and it is retained at a predetermined angular position with respect to shaft 1 by means of a longitudinal pin 5 carried by a shoulder 1a thereof, this pin being engaged into a corresponding hole of hub 2. A tubular light source 6 is disposed immediately in front of disc 3, radially with respect to the latter, said source 6 being surrounded by a casing 7 which opens towards the disc. The light source 6 may be in the form of a tubular electric bulb, of a luminescent tube, etc. A support 8, disposed behind disc 3, carries a row of photothyratrons 9, this row and the light source 6 being situated in the same plane, radially with respect to shaft 1 and to disc 3.

The perforated disc 3 is made of a thin rigid material, as for instance aluminum. Its front side has a series of concentric circular tracks $c$ (FIG. 1) disposed at regular radial intervals and a series of radial lines $r$ also uniformly disposed angularly on the disc. The arrangement is such that when a radial line $r$ is situated in the average plane of the linear source 6 and of the photothyratrons 9, the intersections of this line with the successive circular tracks are exactly situated in front of the successive photothyratrons.

Shaft 1 is rotated by successive angular steps so as to successively bring the radial lines $r$ in front of the row of photothyratrons 9 and of the light source 6. It is thus appreciated that if the disc 3 has perforations such as 10 at some of the intersections of a given radial line $r$ with the circular tracks $c$, when this radial line will be at standstill in the common radial plane of source 6 and of photothyratrons 9, those of the latter which are in front of perforations 10 will be actuated (i.e., rendered conducting) by the light from source 6, the other remaining at rest (i.e., in the non-conducting state). The perforated disc thus constitutes a quite simple means to selectively control the photothyratrons 9 for each successive angular position of shaft 1 and of the said disc.

The angular advancing mechanism which drives shaft 1 and disc 3 may be of any kind whatever. As an example, FIG. 3 shows very diagrammatically a first possible embodiment of such a mechanism. Shaft 1 carries a toothed wheel 11 adapted to be actuated by a pawl 12 pivoted at 13 on the end of a lever 14 which is itself pivoted at 15 on the fixed frame of the apparatus. Pawl 12 is urged by a spring 16 against an abutment 14a secured to lever 15, the latter being itself urged by a spring 17 against a fixed abutment 18. A solenoid 19 lowers lever 14 against spring 17, whereby pawl 12 advances wheel 11 through one tooth. The advancing movement is limited by a second fixed abutment 20 which acts on pawl 12 itself, the said pawl being thus clamped between abutments 14a and 20. At this position of pawl 12, any further rotation of wheel 11 under the effect of kinetic energy is prevented.

Solenoid 19 (or the actuating member of any other advancing mechanism) may be controlled in a number of different ways according to the operation to be performed. In the case of the displacement of a carriage, when the latter reaches the desired position it may be arranged to actuate a contact which closes the energizing circuit of solenoid 19. Solenoid 19 may also be controlled by an auxiliary apparatus mounted on the carriage when this apparatus reaches the end of its stroke, as for instance by a hoisting apparatus when same has lowered or raised the article to be treated. Further when the movable carriage has to remain at a given station during a predetermined time, solenoid 19 may be controlled by a time switch or the like, the latter being itself actuated by disc 3 through the medium of an appropriate perforation thereof. However in a preferred embodiment of this invention solenoid 19 is controlled by a relay which is arranged to detect the state of rest of the whole plant when an operation is ended, as for instance the absence of any electric current in the circuits of the electric motors which actuate respectively the carriage and the apparatus which it supports. This relay then closes a contact 21 in the circuit of solenoid 19. As soon as the disc has advanced through one angular step the next operation begins and consequently the detecting relay opens contact 21 to de-energize solenoid 19.

FIG. 4 illustrates another embodiment of a disc advancing mechanism. Shaft 1 carries a gear wheel 22 driven by a pinion 23. the respective diameters being such that pinion 23 makes one full revolution for each advancing step of the disc. The shaft 24 of pinion 23 carries a cam 25, the single boss of which opens a switch 26 disposed in the circuit of an electric motor 27 adapted to drive shaft 24. The controlling contact 21 is mounted in parallel with respect to switch 26. During an operation cam 25 is stopped at such a position that its boss opens switch 26. Since contact 21 is then open, motor 7 remains at standstill. As soon as the operation is ended, contact 21 closes, as for instance under the action of a detecting relay, as above explained. Motor 27 is therefore started and the boss of cam 25 liberates switch 26 which closes. Motor 27 thus advances wheel 22 through an angle which corresponds to the passage of the disc from one angular position to the next one and as soon as it reaches this latter position a new operation begins and contact 21 opens, in such a manner that motor 27 stops when the boss of cam 25 again opens switch 26.

It will easily be appreciated that pinion 22 could also turn each time through a portion of a revolution, as for instance one half, one third, etc., for each angular advance of the disc, cam 25 then comprising a corresponding number of bosses namely two, three, etc. Further it is obvious that accessory devices should be provided for insuring that the disc stops exactly at the required position in spite of inertia forces. Such a device may for instance be formed of an automatic brake which would act on shaft 24 as soon as motor 27 is de-energized.

In the case of FIG. 4, as also in the case of FIG. 3, if a time of rest is to be provided between the beginning of an operation and the next one, as for instance for the duration of a treatment, there may be used a time device which may act on the detecting relay, in order to delay the closing of contact 21, or on an auxiliary contact disposed in series with the latter and which would only close after the time required. This time device may be rendered operative by a particular perforation of the disc, or it may be automatically started when the carriage reaches a predetermined station.

It is to be noted that the mechanism of FIG. 4 has the advantage that if a position of the disc is not to be used and is therefore unperforated, it is automatically passed since contact 21 does not open.

In order to ensure stoppage of the carriage at any selected position, means should be provided to detect when the said carriage reaches this position. In the embodiment of FIGS. 5 and 6 there is provided on the carriage (which may be supposed as moving horizontally) a vertical row of normally closed contact devices 28a, 28b, 28c, 28d, 28e, while at each position of stop (station) there are mounted stationary cam surfaces 29a, 29b, 29c, 29d, each being high enough to simultaneously actuate two contact devices. In the case of FIG. 5 cam surface 29c simultaneously actuates contact devices 28c and 28d. As shown in FIG. 6 contact devices 28a–28e are disposed in series in a looped circuit which closes through the windings 30a and 30b of the relays which control movement of the carriage in one or the other direction. One of the line wires, which has been referenced 31, is connected between windings 30a and 30b, while the other line wire 32 is connected through some of the photothyratrons 9 between the successive contact devices 28a–28e. These particular photothyratrons have been referenced 9a to 9d.

Further, each relay 30a or 30b comprises a normally closed auxiliary contact, respectively 130a or 130b, the contact of each relay being inserted in series with the winding of the other relay.

Assuming the carriage is in front of the stationary cam surface 29c, as indicated in FIG. 5, it can only remain at standstill if no one of photothyratrons 9a–9d is conducting or if photothyratron 9c only is conducting. If on the contrary the disc is so perforated that another photothyratron, as for instance 9d, is conducting, this has for its effect to close a circuit from line wire 32, photothyratron 9d, contact device 28e (which is closed), the winding of relay 30b and line wire 31. Relay 30b is energized and it is so arranged as to control the driving motor of the carriage for the direction towards cam surface 29d (FIG. 6). The carriage will thus come in front of cam surface 29d which will cause stoppage by simultaneously opening contact devices 28d and 28e, thus isolating the conducting photothyratrons 9d. It is easy to see that actuation of any one of photothyratrons 9a to 9d will have for its result displacement of the carriage towards the corresponding cam surface.

It will be observed that when the carriage begins moving from the position illustrated in FIGS. 5 and 6, contact devices 28c and 28d clear cam surface 29c and therefore close. But this closing of contact devices 28c and 28d cannot energize relay 30a since the circuit of the winding of the latter is opened by the auxiliary contact 130b which has been actuated by relay 30b.

The system of FIGS. 5 and 6 has the advantage that it directly selects the direction of movement of the carriage without requiring for this purpose particular perforations in the controlling disc. It is self-correcting since it brings the carriage to the proper position whatever may be its preceding position (as for instance even if it had been displaced manually). It will further be remarked that even if the carriage were accidentally stopped between two normal stations, this would cause no damage. Relays 30a, 30b would tend to beat, each switching off the other and one would finally operate, thus bringing the carriage to a normal stoppage position, from which correct operation would be resumed. But this system of FIGS. 5 and 6 has inconvenience in that the number of contact devices to be provided on the carriage is equal to the number of stoppage positions or stations, plus one; in the case of a plant comprising a large number of stations the number of contact devices, together with the corresponding wiring, becomes considerable and expensive. This is avoided in the system of FIGS. 7–10. In this system the carriage still supports contact devices 33a–33d, but these devices are normally open and their number has no direct bearing with the number of stations. There is further provided on the carriage an auxiliary contact device 34 which is normally closed. Each station or stoppage position of the carriage is provided with relatively long cam sufaces 35, adapted to selectively actuate contact devices 33a–33d, and with a relatively short cam surface 36 adapted to actuate contact device 34.

The successive stations at which the carriage should be stopped are individualized in accordance with a code, as for instance a binary code. Each station is therefore referenced by a number, each numeral of this number corresponding to the open or closed state of one of contact devices 33a to 33d. In the example illustrated the carriage may be stopped at sixteen positions which are referenced from 0000 to 1111 in a binary system. It will be remarked in this connection that the set of cam surfaces 35 illustrated in FIGS. 8 and 9 corresponds to reference number 1111, since it comprises four cam surfaces adapted to simultaneously actuate the four contact devices 33a–33d of the carriage.

As illustrated in FIG. 10, each contact device 33a–33d is inserted in a circuit which, starting from line wire 31, comprises the said contact device, a diode 37a–37d, and one 38a–38d of the opposed windings of a relay 49a–49b, the said circuit terminating on the second line wire 32. The second winding 39a–39b or each relay 49a–49b is inserted in another circuit which, starting from line wire 31, comprises the said winding and the photothyratron 9a–9d corresponding to the contact device 33a–33d under consideration. The auxiliary contact device 34 is itself inserted in a circuit which starting from the first line wire 31 is divided into two branches, each comprising a photothyratron, respectively 9n–9m and the winding 30a or 30b of one of the relays which control the displacement of the carriage in one or the other direction.

The normally open contacts 41a–41d of relays 49a–49d are mounted in parallel with the auxiliary contact device 34.

Considering for instance relay 49a, the opposed windings 38a–39a thereof are so arranged that when the corresponding contact device 33a is closed and when at the same time the corresponding photothyratron 9a is conducting (i.e., is illuminated through disc 3), this relay does not attract its movable armature, its contact 41a being therefore open. Consequently the auxiliary contact device 34 is always short-circuited by at least one contact 41a–41d, except when all the contact devices 33a–33d and all the corresponding photothyratrons 9a–9d are at respective states representing one and the same combination, it being understood that Zero corresponds to the open state of a contact device and to the non-illumination of a photothyratron, while One corresponds to the closed state of a contact device and to the illumination of a photothyratron.

The circuitry of FIG. 10 operates as follows:

The stoppage position or station to which the movable carriage should be brought has been referenced on the controlling disc 3 by means of the binary reference number of this position with respect to the four photothyratrons 9a–9d. As an example it may be assumed that this binary reference number is 1010. For this purpose the disc has been perforated in front of photothyratrons 9d and 9b, and it has been left plain or unperforated in front of 9c and 9a. Consequently windings 39d and 39b are energized, while windings 39a and 39c are unenergized. Further the preceding position of the carriage has been taken into account and the disc has been perforated in front of the proper one of the photothyratrons 9m and 9n in order to determine movement of the carriage.

The carriage being initially at a stoppage position the reference number of which is not 1010, the combination realized at this same position by cam surfaces 35 for contact devices 33a–33d fails to correspond to the combination realized by the perforation of the controlling disc for photothyratrons 9a–9d. The auxiliary contact device 34 is therefore short-circuited and although it is maintained at the open position by the short cam surface 36, the electric current may pass and actuate one of relays 30a and 30b. The carriage therefore starts in the direction which has been selected by photothyratron 9m or 9n, towards stoppage position station 1010.

If during its travel towards this stoppage position, the carriage passes through an intermediate stoppage position, the auxiliary contact device 34 is opened by the corresponding short cam surface 36, but since at this position the combinations of contact devices 33a–33d and of photothyratrons 9a–9d still fail to correspond to each other, one at least of relays 39a–39d is actuated and the said auxiliary contact is short-circuited. The carriage therefore does not stop at this position.

On the contrary when the carriage reaches the selected stoppage position, contact devices 33a–33d and photothyratrons 9a–9d represent the same combination 1010 and consequently the four relays 49a–49d remain inoperative. When therefore the auxiliary contact 34 opens, the circuit of winding 30a or 30b is cut and the carriage stops.

The difference in length between cam surfaces 35 and cam surface 36 permits of safely realizing the combination of contact devices 33a–33b before actuation of contact device 34.

The system of FIGS. 5 to 10 thus permits of obtaining a large number of stoppage positions or stations with a reduced number of contact devices, but it requires that two circular tracks of the controlling disc be exclusively used for selecting the direction of movement of the carriage and this implies that the said carriage must be initially at a given position. If such were not the case the carriage could start in the wrong direction. But it is easy to avoid any damage in such a case by providing end switches in such a manner that if the carriage moves in the wrong direction it stops at the end of its path while actuating an alarm, or even that its movement be reversed in order that it may directly reach the selected stoppage position.

I claim:

1. A device for the control of the displacement of a movable member along a path including a plurality of successive stoppage positions, comprising contact devices forming a first type of referencing elements operative by cam surfaces which form a second type of referencing elements, plural elements of one type being mounted on said movable member, and multiple groups of elements of the other type being mounted along said path respectively at different stoppage positions, and predetermined elements of the group at each stoppage position being oriented to cooperate with selected ones of the elements mounted on said movable member to close certain contact devices and leave other contact devices open to form a first code output representing the stoppage position at which the movable member has arrived; programming means in which the successive positions at which said movable member should be stopped are registered in the form of predetermined individual program references according to said code, said programming means comprising a perforated disc having a first side and a second side; means to advance said disc through one angular step whenever said movable member should move from one stoppage position to another one; a stationary linear light source disposed in front of said first side of said disc, substantially radially thereto; plural photothyratrons disposed in a linear row in front of said second side of said disc, substantially in the same radial plane of said disc as said linear light source, so as to be selectively illuminated by said light source between the successive advancing steps of said disc, the illuminated and non-illuminated states respectively of said photothyratrons forming a second similar binary code output representing in each case a stoppage position to which said movable member should be brought; means to compare each first code output formed by cooperative contact devices and cam surfaces at a stoppage position when said movable member arrives thereat with the second code output formed by said programming means and representing the position to which said movable member should be brought; and means to cause stoppage of said movable member when said first and second code outputs are identical.

2. A device for the control of the dipslacement of a movable member along a path embodying a plurality of successive stoppage positions, comprising contact devices forming a first type of referencing elements operative by cam surfaces which form a second type of referencing elements, plural elements of one type being mounted on said movable member, and multiple groups of elements of the other type being mounted along said path respectively at different stoppage positions, and predetermined elements of the group at each stoppage position being oriented to cooperate with selected ones of the elements mounted on said movable member to close certain contact devices and leave other contact devices open to form a first binary code output representing the stoppage position at which the movable member has arrived; programming means for generating second coded outputs respectively representing successive stoppage positions to which said movable member should be brought in accordance with said binary code; comparing means to compare the binary outputs generated in said programming means for the stoppage position to which said movable member should be brought with the binary outputs detected by said cooperative contact devices and cam surfaces whenever said movable member passes through a stoppage position, said comparing means comprising a plurality of relays, each having a first winding energized by one of said contact devices and a second winding energized by an output from said programming device, said second winding being opposed to said first winding in such manner that each relay will always be inoperative when its first and second windings are both energized or both unenergized; and stopping means to cause stoppage of said movable member in response to the simultaneous inoperative state of all said relays when said binary outputs from said programming means and said binary outputs from said contact devices are identical.

3. A device for the control of the displacement of a movable member along a path embodying a plurality of successive stoppage positions, comprising main contact devices forming a first type of referencing elements operative by main cam surfaces which form a second type of referencing elements, plural main elements of one type being mounted on said movable member, and multiple groups of main elements of the other type being mounted along said path respectively at different stoppage positions, and predetermined main elements of the group at each stoppage position being oriented to cooperate with selected ones of the main elements mounted on said movable member to close certain main contact devices and leave other main contact devices open to form a first binary code output identifying the stoppage position at which the movable member has arrived; normally closed auxiliary contact and auxiliary cam surface means operative to be opened in response to the arrival of said movable member at each of said stoppage positions, said auxiliary contact and cam surface means being oriented with respect to said main referencing elements at each of said stoppage positions to cooperate chronologically after some of said main contact devices have been closed by said main cam surfaces; programming means for generating second coded outputs respectively representing successive stoppage positions to which said movable member should be brought in accordance wtih said binary code; a plurality of comparing relays, each having a first winding energized by one of said main contact devices and a second winding energized by an output from said programming device, said second winding being opposed to said first winding in such manner that each relay will always be inoperative when its first and second windings are both energized or both unenergized; a normally open relay contact actuated by each of said relays, the contacts of all said relays being electrically connected in parallel with said auxiliary contact means to short-circuit same and to therefore render same inoperative during passage of said movable member through one of said stopping positions when said outputs from said main contact devices and said outputs from said programming means are not identical.

4. In a device as claimed in claim 3, said main contact devices and auxiliary contact means being mounted upon said movable member and said main cam surfaces and auxiliary cam means being stationary at each of said stoppage positions, the auxiliary cam means at each stoppage position being shorter in length than said main cam surfaces and disposed to only actuate said auxiliary contact means after said main contact devices have been selectively actuated by said main cam surfaces and being further disposed to release said auxiliary contact means before all said main contact devices are released from said main cam surfaces.

References Cited

UNITED STATES PATENTS

| | | | |
|---|---|---|---|
| 2,887,635 | 5/1959 | Schmid | 318—19 |
| 2,898,483 | 8/1959 | Muller. | |
| 3,112,378 | 11/1963 | Holzer | 200—46 |

BENJAMIN DOBECK, *Primary Examiner.*